United States Patent
Navas Sabater et al.

(10) Patent No.: US 6,366,477 B2
(45) Date of Patent: Apr. 2, 2002

(54) RESONANT SWITCHED POWER CONVERTER

(75) Inventors: Jose Andres Navas Sabater; Miguel Rascon Martinez, both of Madrid (ES)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/862,519

(22) Filed: May 23, 2001

(30) Foreign Application Priority Data

Jun. 9, 2000 (ES) .......................................... 200001462

(51) Int. Cl.$^7$ .............................................. H02M 3/335
(52) U.S. Cl. ..................................... 363/21.02; 363/131
(58) Field of Search ........................ 363/16, 20, 21.02, 363/97, 131; 323/208, 209, 210; 327/304, 595

(56) References Cited

U.S. PATENT DOCUMENTS 3,641,367 A * 2/1972 Griffing ...................... 327/304
5,736,884 A * 4/1998 Ettes et al. ............. 327/595 X
6,229,717 B1 * 5/2001 Corral Blance et al. . 363/21.14

* cited by examiner

Primary Examiner—Jessica Han
(74) Attorney, Agent, or Firm—Sughrue Mion, PLLC

(57) ABSTRACT

Resonant switched power converter in which the end of a resonant period coincides with the start of a conducting period of a first switching element, undesirable dead times being avoided during the operation of a self-excited synchronous rectifier. To achieve this, a first capacitor is added which has the characteristic that its capacitance is a function of the duty cycle of the first switching element. The variation in the value of the capacitance of the first capacitor is implemented by adding in parallel thereto a serial combination of a second capacitor and a second switching element. The value of the capacitance varies between a first value and a second value.

8 Claims, 1 Drawing Sheet

RESONANT SWITCHED POWER CONVERTER

OBJECT OF THE INVENTION

The present invention relates to a single-output resonant switched power converter, in which the transfer of energy between the input and the output thereof is governed by a switching element located on the primary side of the resonant switched power converter.

The secondary side of the converter includes a resonant circuit that carries out the demagnetisation of the core of a transformer, which electrically isolates the input from the output of the resonant switched power converter.

The resonant switched power converter is of special application, but not exclusively, in distributed power supply systems in which switched power converters with low voltage and power consumption are required, since they are mounted on printed circuit boards as one more electronic component thereof, and consequently a high integration density and reduced dimensions are required.

STATE OF THE ART

A switched power supply converter is known from the U.S. Pat. No. 5,886,881 granted to Xia et al., incorporated in the present patent application by reference. It describes a single-output forward converter that comprises on the primary side a serial combination of a primary winding of a transformer and a first switching element, which is connected to an input voltage supplied by a direct current (DC) power source.

On the secondary side, a secondary winding of the transformer is connected in cascade to a self-excited synchronous rectifier and to a filter that applies an output voltage to a load. The output of the filter constitutes the output of the switched power converter.

A serial combination consisting of a capacitor and a second switching element is connected in parallel with a third switching element, which forms the rectifier branch of the self-excited synchronous rectifier.

When the first switching element is in a conducting state, the input voltage is applied to the input of the self-excited synchronous rectifier through the transformer. During this period there is direct energy transfer between the input and the output.

When the first switching element is in a non-conducting state, the second switching element is in conduction, a magnetising current flowing from the secondary winding to the capacitor, which is charged to a voltage proportional to the input voltage. The result being that the voltage on the secondary winding is maintained constant, or clamped, and the core of the transformer is demagnetised, or reset.

A drawback of the forward switched power converter is that the non-conducting period of the first switching element is constant and, as a consequence, the demagnetisation of the core of the transformer does not take place during the entire non-conducting period of the first switching element, the result being that in the event of major variations of the input voltage, undesirable dead times appear in the switching of the self-excited synchronous rectifier.

For this reason, it is necessary to develop a switched forward power converter which accepts a broad range of input voltages and guarantees, for all of them, that the demagnetisation of the core of the transformer takes place throughout the entire non-conducting period of the first switching element, in such a manner that in the operation of the self-excited synchronous rectifier no dead times appear over the whole range of input voltages. All this leading to an enhancement of the forward converter performance, while maintaining both simplicity of design and of operation of the forward converter.

CHARACTERIZATION OF THE INVENTION

To overcome the problems described above, a resonant switched power converter is proposed that is capable of making the end of the resonant period coincide with the start of the conducting period of a first switching element, thereby avoiding undesirable dead times during the operation of a self-excited synchronous rectifier.

To achieve said objective a first capacitor is added which has the characteristic that its capacitance is a function of the duty cycle of the first switching element. To achieve said objective the first capacitor is connected in parallel with a second winding of a transformer.

The variation of the value of the capacitance of the first capacitor is carried out by adding in parallel with said first capacitor a serial combination of a second capacitor and a second switching element. The value of the capacitance varies between a first value and a second value.

By controlling the value of the capacitance of the first capacitor, the end of the resonant period is made to coincide with the end of the nonconducting period of the first switching element.

BRIEF DESCRIPTION OF THE DRAWINGS

A more detailed explanation of the invention is given in the following description based on the figures attached in which.

DESCRIPTION OF AN EMBODIMENT

Figure 1:
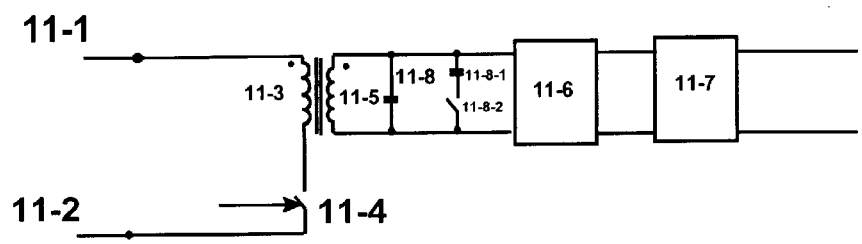
FIG. 1 shows an electrical circuit diagram of a resonant switched power converter according to the invention, FIG. 2-a shows, in graphical form, the waveform of the voltage across two terminals of a first switching element during a non-conducting period in which there is a dead time, and FIG. 2-b shows, in graphical form, the waveform of the voltage across two terminals of the first switching element during a resonant period according to the invention.

In FIG. 1 can be seen an embodiment of a resonant switched power converter that comprises some input terminals 11-1 and 11-2, through which it is connected to a power source that supplies a voltage such as a predetermined DC voltage.

A transformer provides isolation between the input and the output of the resonant converter. The transformer has a first winding 11-3 such that one of its ends is connected to one of the input terminals 11-1 for example, and its other end is connected to a first terminal of a first switching element 11-4, a second terminal being connected to the other input terminal 11-2 of the power source.

The duty cycle of the first switching element 11-4 is controlled, for example, by means of a pulse width modulator that produces at its output a control signal, which is applied to a control terminal of the first switching element 11-4. The foregoing description constitutes the primary side of the resonant switched power converter.

The secondary side of the resonant converter is formed by the connection in cascade of a second winding 11-5 of the transformer, a rectifier means 11-6 and a filtering means 11-7.

For example, the rectifier 11-6 is a self-excited synchronous rectifier 11-6 formed by two rectifier branches, a first branch being that which really performs the rectification and a second branch which is the free-flow branch. And the filtering means 11-7 is a filter that has a first inductor and a third capacitor.

A first capacitor 11-8 is connected in parallel with the second winding 11-5, and in parallel with this first capacitor 11-8 is added a serial combination formed by a second capacitor 11-8-1 and a second switching element 11-8-2. Both, the first switching element 11-4 and the second switching element 11-8-2 can each be a field effect transistor, MOSFET.

Figure 2:
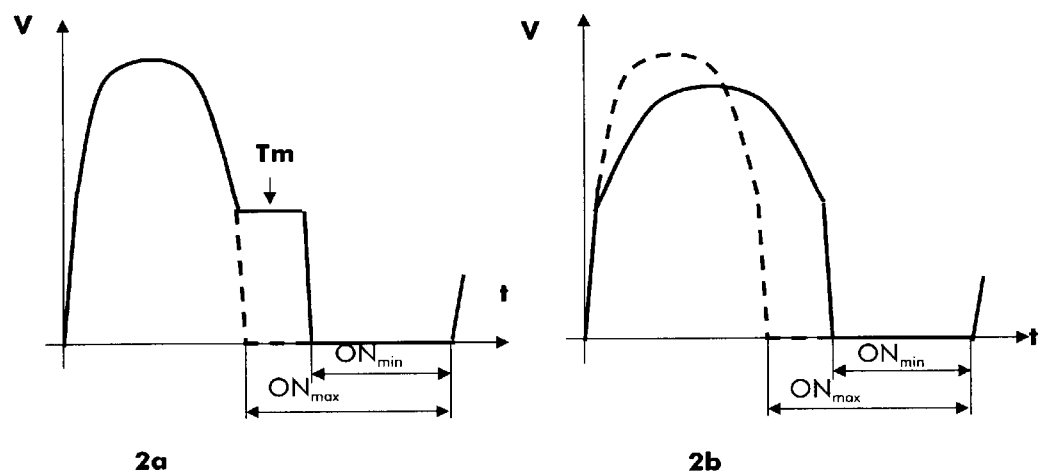

The operation of the resonant converter shall be explained with respect to FIG. 1 and FIG. 2. When the first switching element 11-4 is in a conducting state (ON), the input voltage present across the input terminals 11-1 and 11-2 is applied to the first winding 11-3, inducing a voltage in the second winding 11-5. In this manner, the energy flows towards the rectifier 11-6 at the output of which a square alternating voltage is produced that is filtered by the filter 11-7, obtaining at its output a DC voltage that corresponds to the output of the resonant converter.

Moreover, during this conducting period (ON) of the first switching element 11-4, certain energy is stored in the self-inductance of the transformer by way of current. Said energy has to be removed from the transformer, since otherwise a progressively increasing amount of energy would be stored in the transformer and would lead inevitably to the destruction thereof.

In this state the magnetising energy stored in the transformer is released through a resonance process established between the transformer's self-inductance, the first capacitor 11-8 and the stray capacitance formed between the first and the second terminal of the first switching element 11-4. This process is developed during a non-conducting period of the first switching element 11-4.

A conducting period (ON) is followed by a non-conducting period of the first switching element 11-4, in which the voltage on the input of the filter 11-7 is zero and the voltage across the extremities of the first inductor is now reversed, in such a manner that the current of the first inductor decreases.

Moreover, during this non-conducting period the transformer's self-inductance is discharged, since the resonant circuit creates a discharge path. Over this discharge path flows a current which demagnetises the transformer and that cannot be interrupted in an abrupt manner. Consequently, the first capacitor 11-8 starts to charge with a negative voltage.

At a given moment of the resonant period or non-conducting period, such as the mid-point of said period, this current reaches value zero, and due to the first capacitor 11-8 being charged with a negative voltage, a current is compelled to flow in the opposite direction. As a consequence, the energy that would have been used to charge the first capacitor 11-8 is now used to induce a negative current, and to take the transformer to a point of negative saturation. The first capacitor 11-8 is discharged and the following conducting period (ON) of the first switching element 11-4 stars.

If the end of the discharge period of the first capacitor 11-8 is followed by an interval of dead time Tm, the switching of the first switching element 11-4 does not take place, and thereby there is not a sufficient level of gate voltage to provoke the switching of the switching elements of the self-excited synchronous rectifier 11-6, see FIG. 2a.

This situation is undesirable and is avoided by the resonant converter proposed. Thus, the conducting period (ON) of the first switching element 11-4 starts precisely at the moment in which the first capacitor 11-8 has been discharged, which coincides with the end of the resonant period, see FIG. 2b.

Returning to FIG. 1, and in order to reach this last situation, the series combination of the second capacitor 11-8-1 and of the second switching element 11-8-2 is added in parallel with the first capacitor 11-8. The second switching element 11-8-2 works in the linear region of its characteristic curve.

In this way it is possible to fix the maximum capacitance reached by the second capacitor 11-8-1 and, in turn, to fix the capacitance of the first capacitor 11-8.

As a result the capacitance of the first capacitor 11-8 varies between a first value and a second value, obtaining an extension or a diminution in the resonant time of the first capacitor 11-8 which is adapted to the non-conducting period, since the charging/discharging time of the latter is a function of its capacitance.

As is shown in FIG. 2a, the end of the resonant period is made to coincide with the start of the following conducting period (ON) of the first switching element 11-4. That is, the duration of the resonant period is a function of the duty cycle of the first switching element 11-4 and, consequently, of the output voltage of the resonant converter, since the duty cycle of the first switching element 11-4 is a function of the output voltage.

Another embodiment of the resonant converter is now described. Another way of making the capacitance of the first capacitor 11-8 vary as a function of the duty cycle of the first switching element 11-4 is achieved by making the second switching element 11-8-2 work in one of the two following regions of its characteristic curve: saturation or cut-off.

For example, for certain values of the input voltage, from a first voltage level up to a second voltage level, the second switching element 11-8-2 works in the cut-off region.

For these voltage values, the active time (ON) of the first switching element 11-4 is greater. Therefore the demagnetisation of the transformer is performed in less time, since the switching rate is kept constant. With the second switching element 11-8-2 in cut-off state, the time the resonance requires for demagnetising the transformer is minimal, since it is done with the first capacitor 11-8 only.

For voltage levels between the second voltage level and a third voltage level, the active time (ON) of the first switching element 11-4 is gradually reduced. Consequently for these levels of the input voltage the second switching element 11-8-2 is made to work in the saturation region.

In this manner, the resonance in this case is produced between the sum of the first capacitor 11-8 and the second capacitor 11-8-1 that is greater than the first capacitor 11-8 alone. In this manner, the demagnetisation resonance of the transformer shall last longer, and can be adapted to the voltage levels that occur in this range of input voltages since they are higher, without the undesirable dead times appearing in the gate voltage of the switches of the synchronous rectifier 11-6.

The first voltage level represents the minimum value that the input voltage can take, and the third voltage level represents the maximum value that the input voltage can take.

If the input voltage range is excessively large, it is possible to repeat the aforementioned concept, placing in parallel with the aforementioned devices as many serial combinations of capacitor and switching element as are deemed necessary. In this manner, it is possible to divide the input voltage range into the segments necessary to ensure that at no point of the input voltage do dead times appear in the gate voltage of the switches of the synchronous rectifier 11-6.

The main benefit arising from this embodiment is that it is simpler to implement, since it is not necessary to vary the linear state of the switching element 11-8-2, and it is necessary only to saturate or cut-off said switching element. Moreover it proves more reliable because it is not subject to the tolerances associated with the linear state of the switches and it does not have the losses associated with the linear state of a switch.

However, the principal drawback is that the demagnetisation period of the transformer does not adapt exactly to the non-conducting period of the switching element 11-4. This results in the interruption of the resonance before the voltage on the capacitor 11-8 reaches zero, slightly increasing the losses in said capacitor. Also, the transformer is not taken to the most negative point of saturation possible, for which reason the maximum available flux is not employed.

Thus, depending on the specific application, the most suitable embodiment of the resonant converter shall be chosen. In any case, there are many other possibilities for producing a variable capacitor.

What is claimed is:

1. Resonant switched power converter that comprises a transformer including a first winding and a second winding; a serial combination of said first winding and a first switching element, said second winding being connected in cascade with a rectifier means and a filtering means, a DC voltage being obtained at its output; and a first capacitor being connected in parallel with said second winding, characterised in that said resonant switched power converter includes at least a means for varying the capacitance of said first capacitor in terms of the duty cycle of said first switching element.

2. Power converter according to claim 1, characterised in that said means for varying the capacitance of said first capacitor is connected in parallel with said first capacitor.

3. Power converter according to claim 2, characterised in that said means for varying the capacitance of said first capacitor, includes a serial combination of a second capacitor and a second switching element.

4. Power converter according to any of claim 3, characterised in that the duration of a period of resonance of said first capacitor is variable, ending when a conducting period (ON) of said first switching element starts.

5. Power converter according to claim 4, characterised in that the capacitance of said first capacitor varies between a predetermined first value of capacitance and a predetermined second value of capacitance.

6. Power converter according to claim 4, characterised in that said second switching element is a field effect transistor, MOSFET, and during a conducting period works in the linear region of its characteristic curve.

7. Power converter according to claim 6, characterised in that said second switching element works in the saturation or cut-off region of its characteristic curve during its conducting period.

8. Power converter according to claim 4, characterised in that a current flows through said transformer during said resonant period.

* * * * *